(12) United States Patent
Hedley et al.

(10) Patent No.: US 10,604,078 B2
(45) Date of Patent: Mar. 31, 2020

(54) ACCESS DEVICE

(71) Applicant: JUSTOY PTY LIMITED, Mount Thorley, New South Wales (AU)

(72) Inventors: Robert Ian Hedley, Buttaba (AU); Christopher Nash Whybin, Hamilton (AU)

(73) Assignee: Justoy Pty Limited, New South Wales (AU)

( * ) Notice: Subject to any disclaimer, the term of this patent is extended or adjusted under 35 U.S.C. 154(b) by 0 days.

(21) Appl. No.: 16/327,189

(22) PCT Filed: Aug. 29, 2017

(86) PCT No.: PCT/AU2017/050919
§ 371 (c)(1),
(2) Date: Feb. 21, 2019

(87) PCT Pub. No.: WO2018/039713
PCT Pub. Date: Mar. 8, 2018

(65) Prior Publication Data
US 2019/0184901 A1 Jun. 20, 2019

(30) Foreign Application Priority Data

Aug. 31, 2016 (AU) .................. 2016903478

(51) Int. Cl.
*B60R 3/02* (2006.01)
*E06C 5/04* (2006.01)
(Continued)

(52) U.S. Cl.
CPC .............. *B60R 3/02* (2013.01); *B61D 23/025* (2013.01); *E06C 1/52* (2013.01); *E06C 1/54* (2013.01); *E06C 5/04* (2013.01); *E06C 7/182* (2013.01)

(58) Field of Classification Search
CPC ........... B60R 3/02; B61D 23/025; E06C 1/52; E06C 1/54; E06C 7/181–183; E06C 5/04; E06C 5/16–20
See application file for complete search history.

(56) References Cited

U.S. PATENT DOCUMENTS 2,050,593 A 8/1936 Traut
2,798,653 A * 7/1957 Morrow .................... E06C 1/54
182/93

(Continued)

FOREIGN PATENT DOCUMENTS

WO WO 2005/103433 A1 11/2005

OTHER PUBLICATIONS

International Search Report and Written Opinion for International Application No. PCT/AU2017/050919, dated Oct. 17, 2017, 11 pages.

(Continued)

*Primary Examiner* — Erez Gurari
(74) *Attorney, Agent, or Firm* — Patterson Thuente Pedersen, P.A.

(57) ABSTRACT

A retractable access device (1) adapted to be moved between a first contracted configuration and a second expanded configuration. The access device (1) includes a landing (2), at least one tread step (3), and a pair of linkage assemblies (4). Each linkage assembly (4) is pivotally attached to a respective side edge of each step (3), and includes a plurality of pivotally connected links to support and effect upward and downward movement of each tread step (3) relative to said landing (2).

17 Claims, 6 Drawing Sheets

(51) Int. Cl.
  *E06C 7/18* (2006.01)
  *E06C 1/52* (2006.01)
  *B61D 23/02* (2006.01)
  *E06C 1/54* (2006.01)

(56) References Cited

U.S. PATENT DOCUMENTS

| | | | | |
|---|---|---|---|---|
| 4,615,160 | A * | 10/1986 | LeBlond | E04F 11/0255 14/71.1 |
| 5,228,707 | A | 7/1993 | Yoder | |
| 8,668,216 | B2 * | 3/2014 | Ellement | E06C 5/28 280/166 |
| 9,527,448 | B1 * | 12/2016 | Kay | B60R 3/02 |
| 2003/0221908 | A1 * | 12/2003 | Fix | B60R 3/005 182/127 |
| 2006/0137266 | A1 * | 6/2006 | Whalen | A01K 1/035 52/183 |
| 2009/0188444 | A1 * | 7/2009 | Whalen | A01K 1/035 119/849 |
| 2010/0051387 | A1 * | 3/2010 | Krobot | B60R 3/02 182/158 |
| 2013/0037351 | A1 * | 2/2013 | Gallup | E06C 7/50 182/129 |
| 2014/0174852 | A1 | 6/2014 | Kime et al. | |
| 2015/0060204 | A1 * | 3/2015 | Walter | E06C 1/383 182/163 |
| 2016/0101738 | A1 * | 4/2016 | Iotti | B60R 3/02 182/207 |
| 2017/0246992 | A1 * | 8/2017 | Giesmann | B60R 3/02 |
| 2017/0362895 | A1 * | 12/2017 | Simula | E06C 7/16 |
| 2018/0100289 | A1 * | 4/2018 | Hamaguchi | B60R 16/037 |
| 2018/0194291 | A1 * | 7/2018 | Grammatikos | B60R 3/02 |
| 2018/0194292 | A1 * | 7/2018 | Finstad | B60R 3/02 |
| 2019/0184901 | A1 * | 6/2019 | Hedley | B60R 3/02 |
| 2019/0210531 | A1 * | 7/2019 | Wadivkar | B60R 3/02 |
| 2019/0210533 | A1 * | 7/2019 | Grammatikos | B60R 3/02 |
| 2019/0256005 | A1 * | 8/2019 | Granzotto | E06C 5/20 |

OTHER PUBLICATIONS

International Preliminary Report on Patentability for International Application No. PCT/AU2017/050919, dated May 7, 2018, 15 pages.

* cited by examiner

ACCESS DEVICE

The present application is a National Phase entry of PCT Application No. PCT/AU2017/050919, filed Aug. 29, 2017, which claims priority from Australian Patent Application No. 2016903478, filed Aug. 31, 2016, each of which is hereby fully incorporated herein by reference.

BACKGROUND OF THE INVENTION

The present invention relates to an access device, and in particular, to an access device for providing the access between a substrate surface and an elevated surface, and, which is movable between an expanded or access position and a contracted or storage position.

The access device of the present invention is of concertina-like configuration, which, in the expanded or access position provides a plurality of steps preferably extending generally outwardly and downwardly from an elevated surface. In the contracted or storage position, the steps are retracted in a concertina-like arrangement whereby each of the steps is contracted together.

The present invention is particularly suitable for installation on a vehicle, such as a truck, train, or other vehicle, whereby, when the vehicle is in its normal use, the access device is retracted in a compact manner under an elevated surface of the vehicle such that it does not impede the usual operation of the vehicle, whilst, when in the expanded configuration, the device is extended such that a user may easily climb the steps of the access device between the substrate surface and the elevated surface of the vehicle, or vice versa.

DESCRIPTION OF THE PRIOR ART

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

When it is desired to provide access between an elevated surface, for example on mine or earth moving equipment or on a train or other vehicle, and, a substrate surface, the access device needs to be provided such that, in its stowed position it does not interfere with the normal workings of the vehicle and, in its access position, it provides easy access between the substrate surface and the elevated surface.

Whilst various access devices are known, such as described in the Applicant's previously filed patent applications, they all operate quite differently. Such devices are typically designed to suit unique constraints, so as to not interfere with the normal operations of the vehicle. As such, they are usually stowed and operate quite differently, depending on the particular physical constraints of the vehicle, etc.

SUMMARY OF THE INVENTION

The present invention seeks to provide an access device for providing access between a substrate surface and an elevated surface.

The present invention also seeks to provide a retractable access device which is adapted to be moved between a contracted configuration, in which the device is compactly stored, and, an expanded configuration, wherein a user may easily use the access device to climb from a substrate surface to an elevated surface, or vice versa.

In one broad form, the present invention provides a retractable access device adapted to be moved between a first contracted configuration and a second expanded configuration, the access device including: a landing; at least one tread step; and a pair of linkage assemblies; wherein each linkage assembly is pivotally attached to a respective side edge of each step and includes a plurality of pivotally connected links to support and effect upward and downward movement of each tread step relative to said landing.

Preferably, each at least one tread step includes: at least one intermediate tread step; and, a final tread step.

Also preferably, each linkage assembly is adapted to move generally outwardly and inwardly relative to the sides of said access device as said device moves between the contracted and expanded configurations.

Preferably, each linkage assembly uses a pantograph mechanism adapted to move in a concertina-link configuration.

In a preferred embodiment from the present invention provides a retractable access device adapted to be moved between a first contracted configuration and a second expanded configuration, said access device including: a landing; at least one intermediate tread step; a final tread step; and, a pair of linkage assemblies; wherein, each linkage assembly includes a plurality of pivotally connected links to support and effect upward and downward movement of each tread step relative to each landing.

Preferably, said linkage assembly includes: a first end link, pivotally connected at a first end thereof to either said landing step or said final tread step, and, adapted to pivot in a first direction; a second end link, pivotally connected at a first end thereof to either said landing step or said final tread step, and, adapted to pivot in a second direction opposite to said first direction; at least one first intermediate link, each first intermediate link being pivotally connected intermediate its ends to a respective intermediate tread step and adapted to pivot in a first direction, and, be pivotally attached at each of its ends to an adjacent first link; and, at least one second intermediate link, each second intermediate link being pivotally connected intermediate its ends to a respective intermediate tread step and be adapted to pivot in a second direction opposite to the first direction of the first intermediate link, and, be pivotally attached at its ends to an adjacent second link.

Also preferably, the device further includes an actuator, operatively connected between said linkage assemblies to effect relative movement thereof and thereby effect upward and downward movement of each tread step relative to said landing.

Preferably, said actuator is connected between said a second end of each of said first end links.

Preferably, said actuator includes a hydraulic cylinder.

Also preferably, said actuator is disposed in a direction substantially parallel to said landing.

Also preferably, said actuator is operably connected to a second end of said first link end of each linkage assembly, such that as said actuator is contracted or expanded, said second ends of said first link end are moved towards or apart from each other, and thereby cause said step treads to move downwards or upwards, to thereby effect expansion or contraction of said access device, respectively.

Also preferably, the device further includes a guide extending substantially downwardly from said landing to guide said step tread(s) such that said step treads are maintained in a substantially horizontal position during upward/downward movement.

Preferably, the retractable device includes at least one hand rail or grab rail.

Also preferably, said hand rail or grab rail is adapted to move between a first retracted position and a second access position.

Preferably, said access device is adapted to be installed on a vehicle, such as, but not limited to a truck, tractor, earthmoving or agricultural vehicle, or railway carriage.

Also preferably, said access device is adapted to be installed substantially below the tray of a truck or other vehicle, such that, in its contracted configuration, it is compactly stored below the tray of the vehicle and underneath the vehicle, in a manner which avoids hindering the normal operation of the vehicle.

Preferably, the access device is either retrofitted or formed integrally with a vehicle onto which it is installed.

Preferably, said device is slidably installed on a vehicle.

Also preferably, said device is installed below the tray of a truck, such that it can be slid outwards of said tray and then operated to its expanded condition.

Also preferably, said device includes a pair of guide rails.

In a preferred form, the device includes a guide roller extending from an intermediate pivot point of said uppermost intermediate links which is adapted to engage with a guide channel of each guide, to thereby guide said step tread during upward/downward movement.

Preferably, said guide roller is adapted to abut an end of said guide channel to thereby provide support to said step tread in its position when said device is in its expanded configuration.

BRIEF DESCRIPTION OF THE DRAWINGS

The present invention will become more fully understood by the following detailed description of preferred but not limiting embodiments thereof, described in the connection with the accompanying drawings wherein.

DETAILED DESCRIPTION OF PREFERRED EMBODIMENTS

Throughout the drawings like numerals will be used to identify similar features, except where expressly otherwise indicated.

Figures 1, 1A, 1B, 1C, 1D:
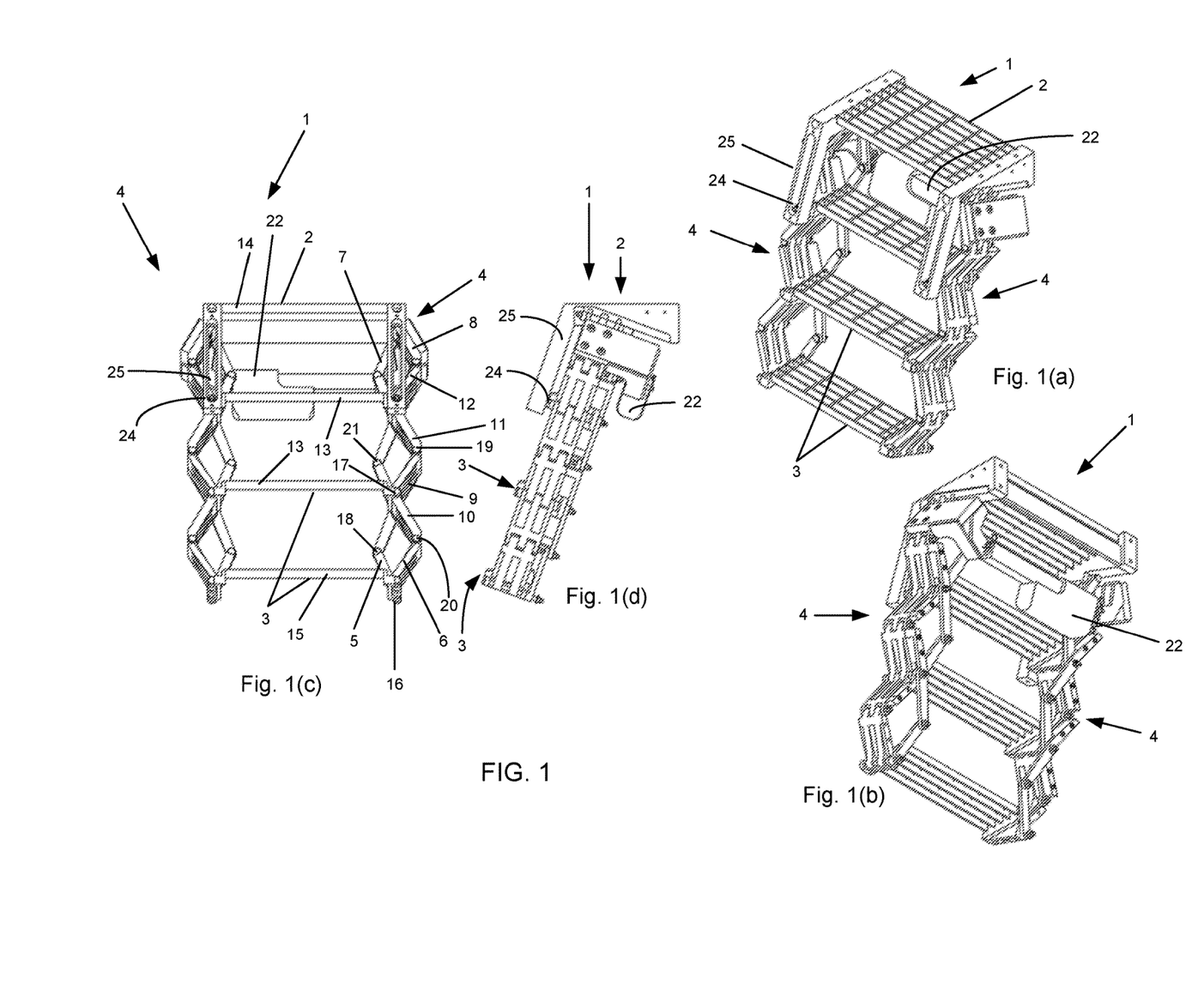
FIG. 1 illustrates various views of a retractable access device in accordance with a preferred but non-limiting embodiment of the present invention, in an expanded configuration.
Figures 2, 2A, 2B, 2C, 2D:
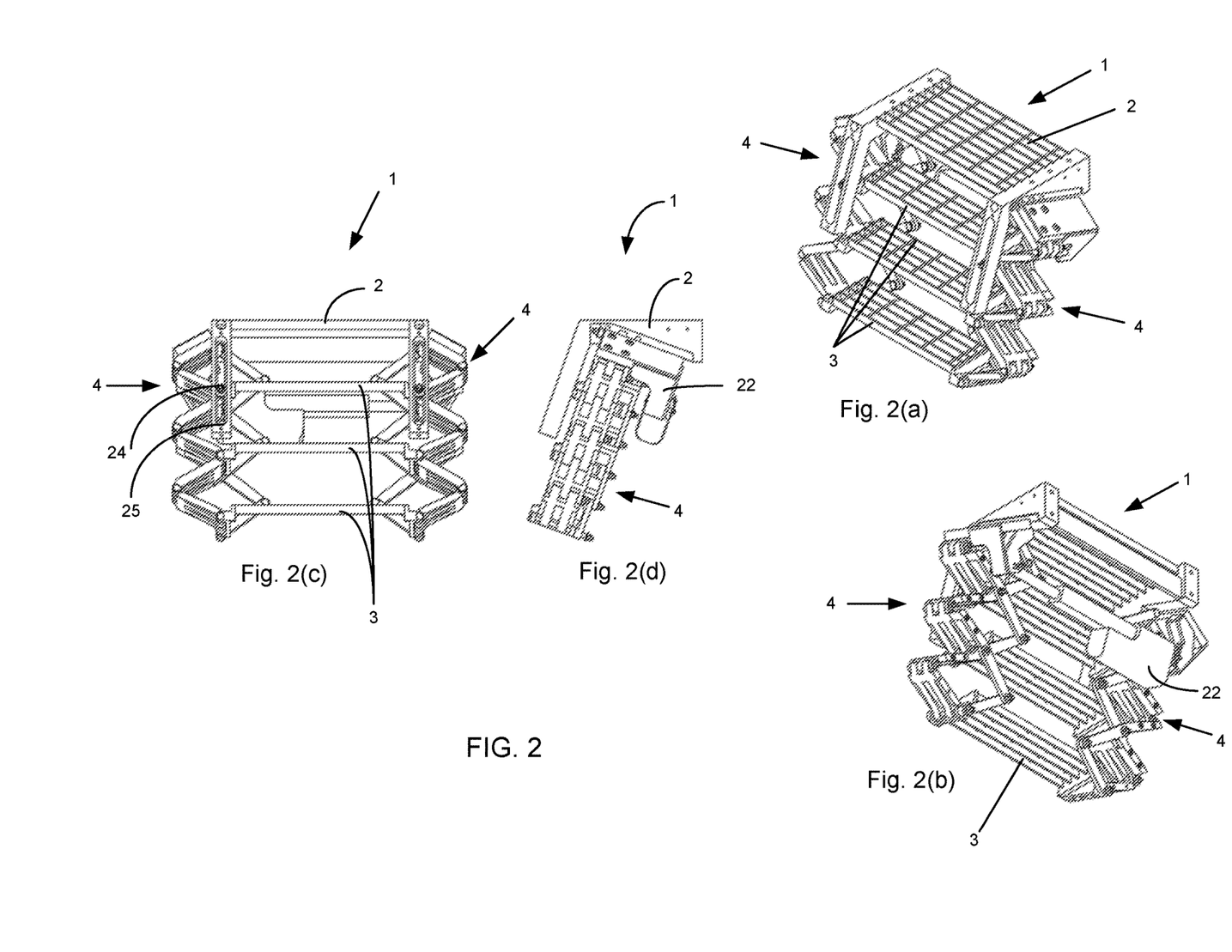
FIG. 2 illustrates the retractable access device of FIG. 1, when in an intermediate position, wherein the device is partially retracted.
Figures 3, 3A, 3B, 3C, 3D:
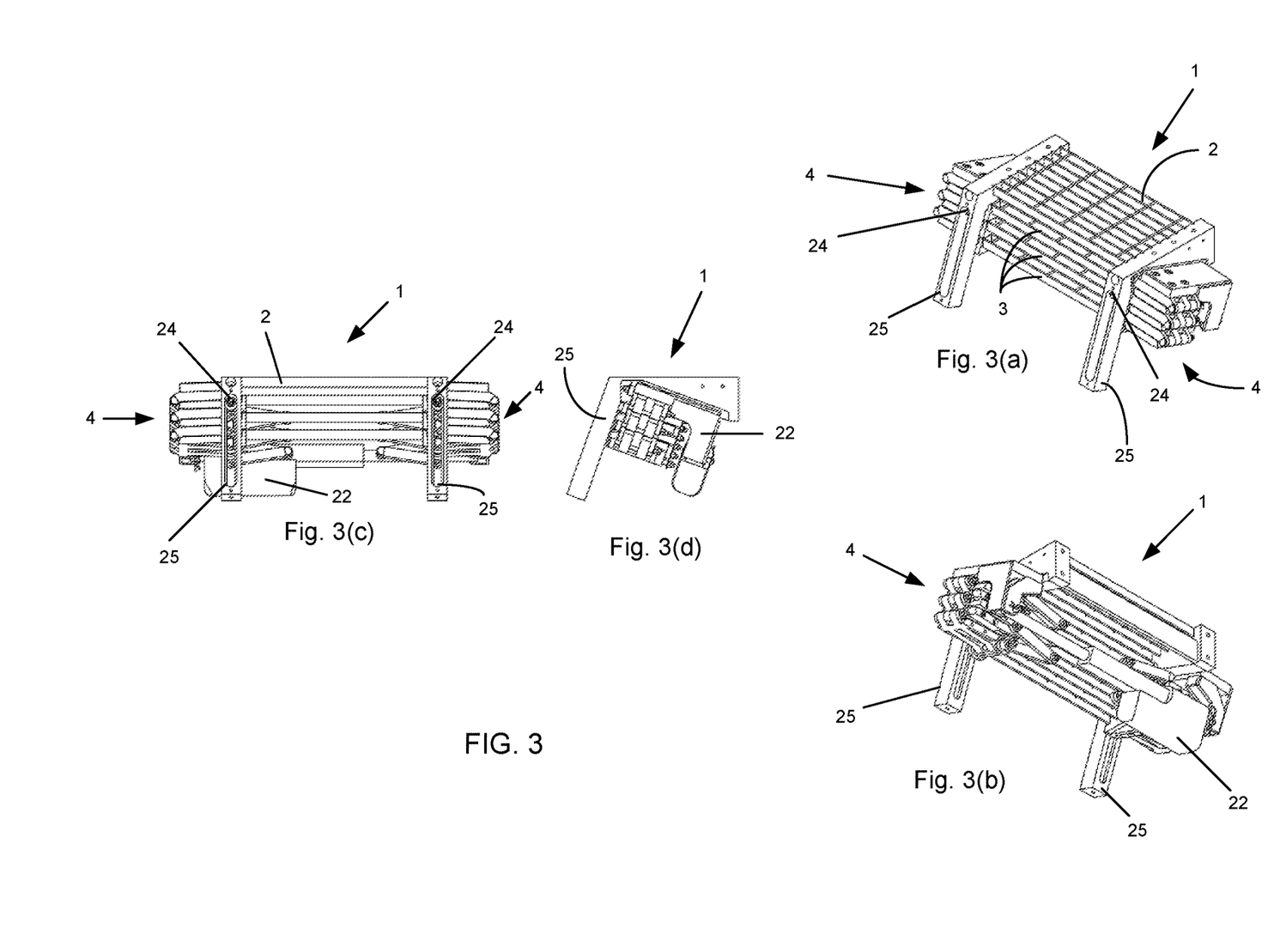
FIG. 3 illustrates various views of the retractable access device of FIGS. 1 and 2, when the device being in the retracted position.

FIGS. 1 to 3 show various views of the retractable access device in accordance with a preferred but non-limiting embodiment of the present invention.

FIG. 1 illustrates the access device in the expanded position wherein a user can climb up or down the access device. FIG. 2 shows an intermediate position of the device wherein it is being partly retracted, whilst FIG. 3 shows the retracted position of the access device.

As shown in FIGS. 1, 2 and 3, an isometric front view of the device is shown in FIGS. 1a, 2a and 3a, whilst an isometric rear view is shown in FIGS. 1b, 2b and 3b. FIGS. 1c, 2c and 3c show a front view of the device, whilst FIGS. 1d, 2d and 3d show a side view of the device.

The access device generally designated by the numeral 1, includes a landing 2 and a plurality of step treads 3. The access device further incorporates a pair of linkage assemblies 4, one on either side of the treads 3. The linkage assemblies 4 include a plurality of pivotally connected links to support the treads 3, and, facilitate upward and downward movement of each tread 3 relative to the landing 2, to thereby effect movement of the access device between the expanded configuration, which is shown in FIG. 1, and, the retracted configuration, which is shown in FIG. 3.

The upper landing 2 may be in the form of a step, intended to be walked on by a user, or, in the form of a landing frame, adapted to attach to the underneath of an elevated surface, such as the tray of a trailer, the floor of a train or other vehicle.

An alternative embodiment of the access device may be integrally formed with the tray of the vehicle, in which case the tray could act as the upper step of the device. Such a modified implementation of the invention will be understood by persons skilled in the art.

As will also be appreciated by a person skilled in the art, the access device 1 of the present invention, may incorporate one or more treads, but preferably a plurality of treads. The number of treads will of course vary depending upon the height between the substrate surface and the elevated surface and the elevated surface to which access is required. The exemplary embodiment illustrated in FIGS. 1 to 3 shows three treads below the landing frame.

It will be appreciated that the access device of the present invention is particularly useful when access to a substrate surface is required, but wherein the substrate surface itself cannot be used to provide support for the device. That is, the access device of the present invention is intended to be entirely supported by the framework attached to the elevated surface, which is typically the tray of a truck or other vehicle.

As displayed in the drawings, the linkage assemblies 4 operate in a concertina-like configuration whereby the component links of each linkage assembly are adapted to move generally outwardly and inwardly relative to the sides of the access device 1 as the device moves between the contracted position shown in FIG. 3 and the expanded configuration shown in FIG. 1.

FIGS. 1c, 2c and 3c perhaps show more clearly the linkage assembly made up of the plurality of links, which, in essence are in the form of a pantograph-like mechanism.

With reference to FIG. 1c, the linkage assembly will now be described.

The linkage assembly 4 shown in FIG. 1c incorporates end links 5, 6, 7 and 8, and intermediate links 9, 10, 11 and 12. The end links 5, 6, 7, and 8 are provided at the upper and lower ends of the retractable access device, whilst the intermediate links 9, 10, 11 and 12 are each pivotally connected to the intermediate treads 13. Obviously, as each additional step tread 3 is added, additional intermediate links 9 and 10 are included on either side of the device 1.

As seen in FIG. 1c, a pair of end links 7 and 8 are provided are pivotally connected to a landing step 14. Likewise, a pair of end links 5 and 6 are provided and attached to the final tread 15, also by way of a pivotal connection. These end links may all operate in a similar manner, so only one such arrangement will be now described in more detail.

As seen in FIG. 1c, a first end link 5 is pivotally connected at pivot point 16 to the edge of the step 15 and, is adapted to pivot about pivot point 16 in a first direction. A second end link 6 is also pivotally connected at a first end thereof to the pivot point 16 at the side edge of step 15, and, is adapted to pivot in a second direction opposite to the first direction of the first end link.

A first intermediate link 9 can be seen to be pivotally connected intermediate its ends at pivot point 17 to tread 13, and, has one of its ends pivotally connected to first end link 5 at pivot point 18. The other end of intermediate link 9 is pivotally connected at pivot point 19 to an end of an adjacent intermediate link 11.

A second intermediate link 10 is pivotally connected at pivot point 20 to an end of second link 6 and, is also pivotally connected at pivot point 21 to an end of intermediate link 12 adjacent thereto. The intermediate portion of second intermediate link 10 is also connected at pivot point 17 to tread 13.

As will be understood by persons skilled in the art, the other various links shown in the drawings all operate in the same or similar manner.

Operation of the retractable access device 1 of the present invention may be effected in a variety of ways including by being manually operated, or, driven by an actuator. An example of an actuator is illustrated in FIG. 1c by reference numeral 22. As seen in FIG. 1c, the actuator 22 is in the form of a hydraulic cylinder, and is operatively connected between the two linkage assemblies 4 on the opposed side of the access device, such that expansion and contraction of the actuator effects relative concertina-like movement of the interconnected linkage assemblies, to thereby effect upward and downward movement of each step relative to the landing.

Alternative actuators may of course be used, including any form of pneumatic, electric motor, mechanical arrangement or the like. Such configurations will be obvious to persons skilled in the art.

As illustrated in FIG. 1a, the access device may further incorporate one or more guide 23. The embodiment illustrated shows a guide roller 24 operatively engaged within a guide channel 25.

The guide roller 24 is operatively attached to the intermediate part of the uppermost intermediate link 11 and 12 by being pivotally connected thereto. The guide roller 24 can therefore move, or "roll", within the guide channel 25 for smooth movement therein. The guide extends downwards from the landing, such that movement of the guide roller 24, connected to the tread 13 is guided by guide channel 25, and such that the step 13 therefore remains substantially horizontal during its upward and downward movement. Preferably a pair of guides 23 is provided, one on each side of the access device 1. This assists in keeping the upper step tread substantially horizontal, or at least substantially parallel to the upper landing.

The remainder of the tread steps will, because of the linkage assemblies connected at the ends thereof, therefore also remain substantially horizontal or at least substantially parallel to the upper landing and/or upper tread steps.

It will also be appreciated that by utilization of the guide channel 25, the guide roller will at some point during movement reach the lower end of the guide channel, as shown in FIG. 1(a), at which time the guide 25 will then restrict any further downward movement of the step treads, and, provide support and effectively secure the step treads 3 in position. In this way, a user may readily access the access device in safe manner without the possibility of any further movement of the step treads occurring, the weight of the operator being at least partly supported by this abutment of the guide rollers 24 at the end of the guide channels 25.

Figures 4, 4A, 4F:
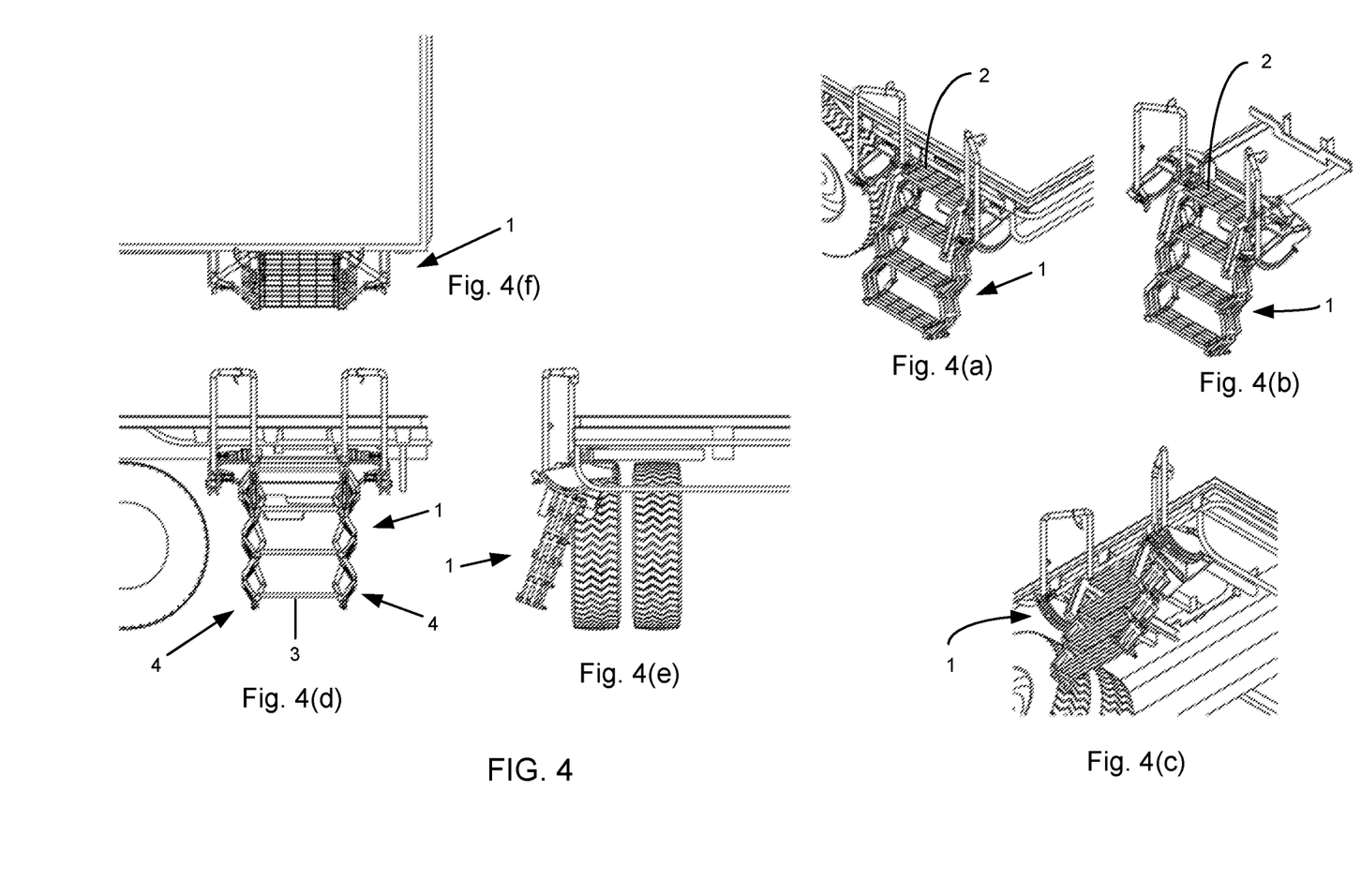
FIG. 4 illustrates various views of the retractable access device in accordance with another preferred but non-limiting embodiment of the invention, incorporating hand rails thereon, the device being shown installed on a tray of a vehicle, the device also being shown in the expanded configuration.
Figures 5, 5A, 5F:
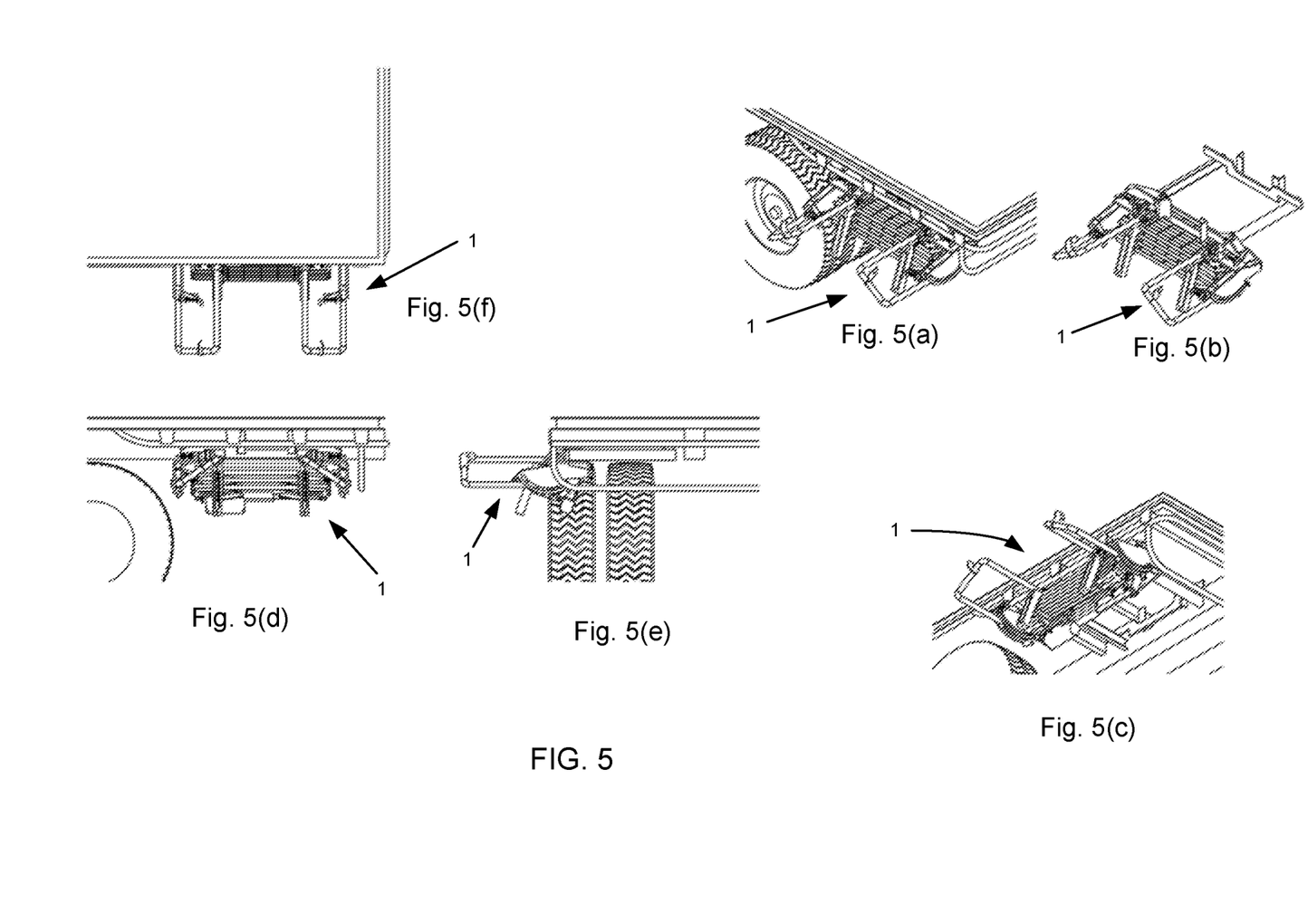
FIG. 5 illustrates the device of FIG. 4, but shown in the contracted position with the hand rails lowered but not retracted; and, FIG. 6 illustrates the device of FIGS. 4 and 5 incorporating the hand rails, but with the hand rails lowered, and, with the device in the fully retracted position substantially below the tray of the vehicle.
Figures 6, 6A, 6E:
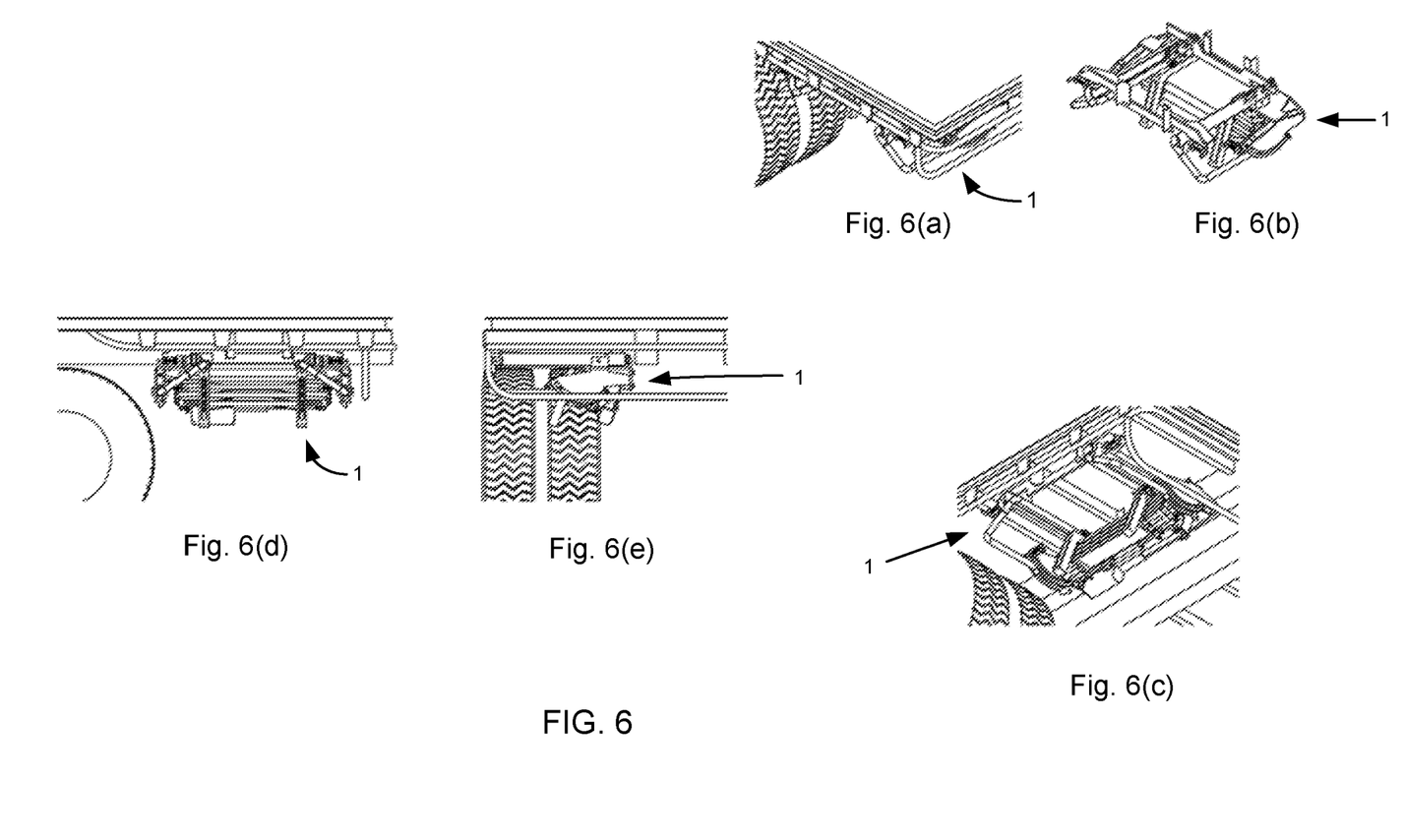

FIGS. 4, 5 and 6 illustrate various views of the access device 1 in accordance with the present invention attached to a tray of a vehicle 27. The embodiment of FIGS. 4, 5 and 6 also shows the incorporation of hand rails or grab rails 26 to assist the user when climbing up or down the access device 1.

FIGS. 4a, 5a and 6a show isometric views of the access device 1 attached to a vehicle 27, whilst FIGS. 4b, 5b and 6b show the device but with the vehicle itself not shown. FIGS. 4c, 5c and 6c show isometric views from underneath the vehicle 1. FIGS. 4d, 5d and 6d show front views of the device 1, whilst FIGS. 4e, 5e and 6e show side views of the device 1, and FIGS. 4f, 5f and 6f show top views of the device 1.

As illustrated, FIG. 4 shows the device 1 wherein the hand rails or grab rails 26 are raised in the access position, and wherein the ladder 1 is in the expanded configuration. FIG. 5 illustrates the access device 1 in the retracted position, with the hand rails 26 lowered by pivotally moving them from a vertical to a horizontal position.

FIG. 6 illustrates the access device 1 also in the retracted position, but with the entire device 1 slid back underneath the tray of the vehicle 27. In this position the entire device 1, including the hand rails or grab rails 26 are lowered and the mount is retracted such that it fits neatly underneath the elevated surface of the vehicle 27 (see FIG. 6e in particular), so as to not obstruct the normal operation of the vehicle.

Throughout this specification, specific terminology has been used for the sake of clarity. However, the invention is not intended to be limited to the specific terminology so selected, and it is to be understood that each specific term includes all technical equivalents which operate in a similar manner to accomplish a similar technical purpose. Terms such as 'front', 'new', 'inwardly', 'outwardly', 'upward', 'downward', etc. are used as words of convenience to provide reference points, and are not to be construed as limiting terms. It will be appreciated that the device may be modified, for example, to extend upwards from a mounted position. Such a version will be obvious to a person skilled in the art and therefore should be considered to fall within the scope of this invention.

The present invention has been herein before described with reference to specific embodiments. It will be appreciated that these embodiments describe a preferred but non-limiting version of the invention which, a person skilled in the art will appreciate can be modified in a variety of ways. All such variations and modifications can be considered to fall within the spirit and scope of the invention as broadly herein before described.

The invention claimed is:

1. A retractable access device adapted to be moved between a first contracted configuration and a second expanded configuration, the access device comprising:
   a landing;
   at least a pair of tread steps, including at least one intermediate step, and, a final step;

a pair of linkage assemblies, each linkage assembly being pivotally attached to a respective side edge of each step, and includes a plurality of pivotally connected links to support and effect upward and downward movement of each tread step relative to said landing; and, a pair of guide rails, each guide rail extending substantially downwardly from said landing to guide said linkage assemblies; and, a pair of guide rollers, each guide roller extending from an intermediate pivot point of an uppermost pair of links, and adapted to engage with a respective guide rail to guide said step during upward/downward movement of said device;

wherein, each linkage assembly is adapted to move generally outwardly and inwardly relative of the sides of said access device as said device moves between the contracted and expanded configurations.

2. A retractable access device as claimed in claim 1, wherein each said linkage assembly uses a pantograph mechanism adapted to move in a concertina-link configuration.

3. A retractable access device as claimed in claim 1, wherein each linkage assembly comprises:
    a first end link, pivotally connected at a first end thereof to either said landing or said final tread step, adapted to pivot in a first direction;
    a second end link, pivotally connected at a first end thereof to either said landing or said final tread step, adapted to pivot in a second direction opposite to said first direction;
    at least one first intermediate link, each first intermediate link being pivotally connected intermediate its ends to a respective intermediate tread step and adapted to pivot in a first direction, and, be pivotally attached at each of its ends to an adjacent first link; and,
    at least one second intermediate link, each second intermediate link being pivotally connected intermediate its ends to a respective intermediate tread step and be adapted to pivot in a second direction opposite to the first direction of the first intermediate link, and, be pivotally attached at its ends to an adjacent second link.

4. A retractable access device as claimed in claim 1, further comprising:
    an actuator, operatively connected between said linkage assemblies to effect relative movement thereof and thereby effect upward and downward movement of each tread step relative to said landing.

5. A retractable access device as claimed in claim 2, wherein said actuator is connected between said a second end of each of said first end links.

6. A retractable access device as claimed in claim 4, wherein said actuator comprises a hydraulic cylinder.

7. A retractable access device as claimed in claim 4, wherein said actuator is disposed in a direction substantially parallel to said landing.

8. A retractable access device as claimed in claim 4, wherein said actuator is operably connected to a second end of said first link end of each linkage assembly, such that as said actuator is contracted or expanded, said second ends of said first link end are moved towards or apart from each other, and thereby cause said step treads to move downwards or upwards, to thereby effect expansion or contraction of said access device, respectively.

9. A retractable access device as claimed in claim 1, further comprising:
    at least one hand rail or grab rail.

10. A retractable access device as claimed in claim 9, wherein said hand rail or grab rail is adapted to move between a first retracted position and a second access position.

11. A retractable access device as claimed in claim 1, adapted to be installed on a vehicle, such as, but not limited to a truck, tractor, earthmoving or agricultural vehicle, or railway carriage.

12. A retractable access device as claimed in claim 1, wherein said access device is adapted to be installed substantially below the tray of a truck or other vehicle, such that, in its contracted configuration, it is compactly stored below the tray of the vehicle and underneath the vehicle, in a manner which avoids hindering the normal operation of the vehicle.

13. A retractable access device as claimed in claim 1, which is either retrofitted or formed integrally with a vehicle onto which it is installed.

14. A retractable access device as claimed in claim 1, wherein said device is slidably installed on a vehicle.

15. A retractable access device as claimed in claim 14, wherein said device is installed below the tray of a truck, such that it can be slid outwards of said tray and then operated to its expanded condition.

16. A retractable access device as claimed in claim 1, wherein said guide roller is adapted to abut an end of said guide channel to thereby provide support to said step tread (s) in its position when said device is in its expanded configuration.

17. A vehicle, including a retractable access device as claimed in claim 1.

* * * * *